(12) United States Patent
Yildiz et al.

(10) Patent No.: US 11,005,132 B2
(45) Date of Patent: May 11, 2021

(54) CELL AND METHOD FOR MANUFACTURING SUCH A CELL

(71) Applicant: Renata AG, Itingen (CH)

(72) Inventors: Burhan Yildiz, Frenkendorf (CH); Daniel Bleyer, Albbruck (DE); Pascal Haering, Muttenz (CH)

(73) Assignee: Renata AG, Itingen (CH)

( * ) Notice: Subject to any disclaimer, the term of this patent is extended or adjusted under 35 U.S.C. 154(b) by 0 days.

(21) Appl. No.: 16/779,156

(22) Filed: Jan. 31, 2020

(65) Prior Publication Data

US 2020/0168854 A1 May 28, 2020

Related U.S. Application Data

(63) Continuation of application No. 16/237,766, filed on Jan. 2, 2019, now Pat. No. 10,892,447.

(30) Foreign Application Priority Data

Jan. 9, 2018 (EP) .................................... 18150687

(51) Int. Cl.
*H01M 50/109* (2021.01)
*H01M 10/04* (2006.01)
(Continued)

(52) U.S. Cl.
CPC ..... *H01M 50/109* (2021.01); *H01M 10/0427* (2013.01); *H01M 50/116* (2021.01);
(Continued)

(58) Field of Classification Search
None
See application file for complete search history.

(56) References Cited

U.S. PATENT DOCUMENTS

| | | | |
|---|---|---|---|
| 3,891,462 A | 6/1975 | Langkau | |
| 5,558,679 A | 9/1996 | Tuttle | |

(Continued)

FOREIGN PATENT DOCUMENTS

| | | |
|---|---|---|
| JP | 58-131560 U | 9/1983 |
| JP | 2006-40596 A | 2/2006 |

OTHER PUBLICATIONS

European Search Report dated Mar. 1, 2018 in European Application 18150687.4, filed on Jan. 9, 2018 (with Written Opinion).

*Primary Examiner* — Wyatt P McConnell

(74) *Attorney, Agent, or Firm* — Oblon, McClelland, Maier & Neustadt, L.L.P.

(57) ABSTRACT

A cell, in particular a button cell, and to a method for manufacturing such a cell, the method includes providing a first part and a second part intended to respectively form the lid and the cup of the housing, the first part including an edge area with a zone inclined or perpendicular with respect to a center axis of the housing; applying a layer of adhesive on the edge area of the first part; then inserting the first part into an open end of the second part, the layer of adhesive on the edge area being finally turned towards the open end of the second part; closing the housing by bending an upper portion of the side wall on the zone of the edge area provided with the layer of adhesive, and curing the layer of adhesive to form an adhesive joint sealing the housing.

18 Claims, 5 Drawing Sheets

(51) Int. Cl.
    *H01M 50/116*     (2021.01)
    *H01M 50/153*     (2021.01)
    *H01M 50/148*     (2021.01)
    *H01M 50/166*     (2021.01)
    *H01M 50/171*     (2021.01)
    *H01M 50/183*     (2021.01)

(52) U.S. Cl.
    CPC ....... *H01M 50/153* (2021.01); *H01M 50/154* (2021.01); *H01M 50/166* (2021.01); *H01M 50/171* (2021.01); *H01M 50/183* (2021.01)

(56) References Cited

U.S. PATENT DOCUMENTS

| | | |
|---|---|---|
| 5,601,941 A | 2/1997 | Tuttle |
| 2008/0096074 A1 | 4/2008 | Wu |
| 2010/0068614 A1* | 3/2010 | Yamaguchi ......... H01M 50/171 |
| | | 429/162 |
| 2014/0087239 A1 | 3/2014 | Tischendorf |
| 2018/0241013 A1* | 8/2018 | Vuille ................ H01M 2/0222 |

* cited by examiner

CELL AND METHOD FOR MANUFACTURING SUCH A CELL

CROSS-REFERENCE TO RELATED APPLICATION

This application is a continuation of U.S. patent application Ser. No. 16/237,766, filed on Jan. 2, 2019, and claims priority to European Patent Application No. 18150687.4 filed on Jan. 9, 2018. The benefit of priority is claimed to each of the foregoing, and the entire contents of each of the foregoing are incorporated herein by reference.

TECHNICAL FIELD

The invention relates to a cell, in particular a button cell, with a housing comprising a cup and a lid joined together with an adhesive and to the method for manufacturing this cell.

BACKGROUND OF THE INVENTION

Button cells usually have a housing with a cup and a lid respectively forming the positive and the negative poles. Generally, a preformed elastomer seal arranged between the cup and the lid ensures the galvanic isolation between both parts whilst the liquid-tight closure of the cell is carried out by crimping the edge of the cell cup over the cell lid to compress the seal. This current design of the housing 2 is represented in FIG. 1 with the cup 3, the lid 4 and the seal 5. This construction of the housing with an elastomer seal takes up a lot of space, which reduces the volume available for the active material. For this standard construction, the ratio between the internal volume of the housing available for the active material and the external volume of the housing only amounts to ~70%.

In order to increase the internal volume and thus the capacity of the cell, a solution is to replace the elastomer seal with an adhesive joint. This solution is promising but needs further improvements in particular in terms of adhesion between the assembled parts. Several factors can adversely affect the adhesion of the joint and hence the tightness of the cell. More specifically, in use, the joint can be subject to a stress in case of overpressure inside the cell. Depending on the position and the orientation of the joint, the stress can have a positive or a negative impact on the adhesion of the joint. So, if the joint is not adequately arranged, it will be subject to a tensile and/or a shear stress impairing its adhesion.

Other factors during the manufacture of the cell can also affect the adhesion of the joint. For example, the presence of liquid active material such as the electrolyte inside the housing can contaminate the surfaces to be assembled and thereby compromise the adhesion of the joint on these surfaces.

SUMMARY OF THE INVENTION

The present invention aims to provide a new method for manufacturing a cell comprising two parts assembled with an adhesive joint, forming a seal and an electrical insulation in between, in order to increase the internal volume of the cell. The method is specifically designed to provide a cell with an adhesive joint arranged to work in compression in case of overpressure inside the housing.

To this end, the method of manufacturing according to the invention consists in providing a first part and a second part respectively intended to form the lid and the cup of the cell housing and respectively defining the two poles of the cell, filling the first part and/or the second part with at least a solid active material, applying a layer of adhesive on an edge area of the first part, at least on a zone of this edge area which is inclined or perpendicular with respect to a center axis of the housing defined as an axis Z perpendicular to a base of the second part, then, inserting the first part into an open end of the second part with the adhesive layer being finally turned towards the open end, then, bending an upper portion of the second part adjacent to the open end on said zone of the edge area provided with at least a part of the layer of adhesive in order to close the housing, and then, curing said layer of adhesive to form an adhesive joint sealing the housing and electrically insulating the two poles.

Accordingly, the adhesive joint is arranged between the inner side of the cup and the outer side of the edge area of the lid with an orientation not parallel to the center axis of the housing in the zone of the edge area. Therefore, the joint is subject to a compression stress with the upper portion of the cup acting as a mechanical stop in case of overpressure inside the cell. It results from this arrangement that a higher inside pressure, until a certain upper limit, will not jeopardize the assembling and sealing functions of the adhesive joint by damaging this adhesive joint, so that no explosion of the cell will occur.

Preferably, the zone of the edge area provided with the adhesive layer is inclined with an angle lower than 90° with respect to the axis Z. For this particular inclination, the maximum stress on the adhesive joint in case of overpressure inside the housing, within a given range of pressure, is reduced compared to an arrangement wherein the zone of the edge area provided with the adhesive layer is inclined with an angle greater than 90 relative to the axis Z.

Advantageously, the liquid active material likely to contaminate the adhesive layer and the surface intended to come into contact with the adhesive layer is filled inside the housing after closing this latter and curing the adhesive layer. The electrolyte is filled inside the housing via a hole made into the cup and afterwards closed by gluing or welding.

Other advantageous variant consists in cleaning the surface intended to come into contact with the adhesive layer before the bending step, for example, by laser cleaning. Another advantageous variant consists in folding the contaminated surface on the inner side of the second part such that a surface not previously exposed to the electrolyte faces the zone of the edge area before bending.

So, the new construction of the housing with an adhesive joint allows to increase the ratio between the internal volume of the housing available for the active material and the external volume of the housing by about 10% whilst ensuring the tightness of the cell. Due to the higher inside volume, more active material can be inserted in the cell, which increases the energy density and the capacity of the cell.

Moreover, compared to an assembly with a seal, the method of manufacturing according to the invention is simplified because it does no longer require to pre-form the seal and then to assembly the seal and the lid.

Furthermore, the method of manufacturing according to the invention has the advantage that the housing can be assembled starting from only two parts.

DETAILED DESCRIPTION OF THE INVENTION

Figure 1:
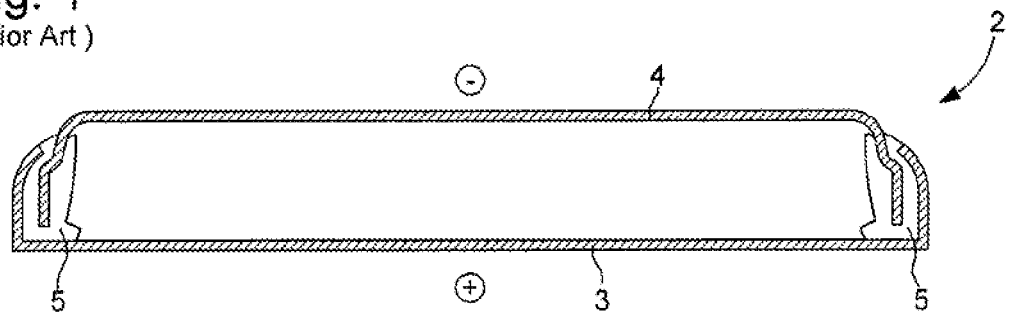
FIG. 1 is a cross section view of a cell housing according to the prior art (active material not represented).

The invention relates to a method for manufacturing a cell, in particular a button cell, with a housing comprising, or constituted of, two parts assembled by adhesive bonding and defining the two poles of the cell.

The cell 1 manufactured with said method is represented in FIGS. 2A, 2B, 3 and 4. It comprises a housing 2 with a cup 3 forming the positive pole closed by a lid 4 forming the negative pole. Both parts are joined with an adhesive joint 6. The cup 3 comprises a base 3a surmounted by a lateral wall 3b ending in an upper rim 3c turned towards the inside of the housing. The lid 4 comprises a central area 4a delimited by an edge area 4b with a connecting area 4c in between.

According to the invention, the upper rim 3c of the cup 3 covers at least partly the edge area 4b of the lid 4 with the whole or a part of the adhesive joint 6 in between. At least a part of the adhesive joint 6 is thus positioned between the inner side of the upper rim 3c of the cup 3 and the outer side of the edge area 4b of the lid 4. As better illustrated in FIG. 3, the adhesive joint 6 may extend to the connecting area 4c of the lid 4 and/or slightly beyond the edge area 4b in direction of the lateral wall 3b of the cup 3 for a better seal between the cup 3 and the lid 4. The edge area 4b provided with the adhesive layer 6 may also extend along a portion of the lateral wall 3b of the cup 3 (variant not represented in the figures). However, this arrangement is not advantageous for enhancing the internal volume of the cell but may enhance the assembling force and the sealing function.

Figure 2A:
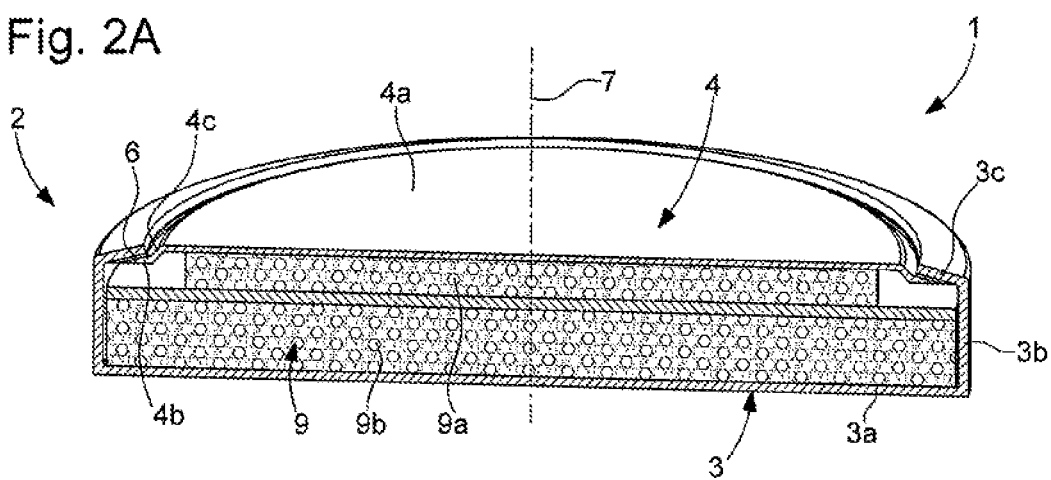
FIG. 2A is a perspective view in cross section of the cell assembly according to the invention.
Figure 2B:
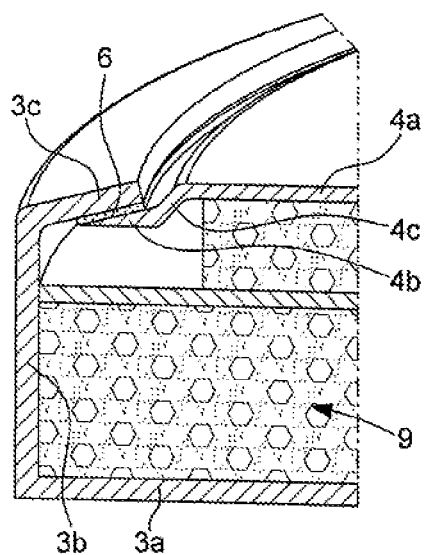
FIG. 2B is a partial view of FIG. 2A.
Figure 3:
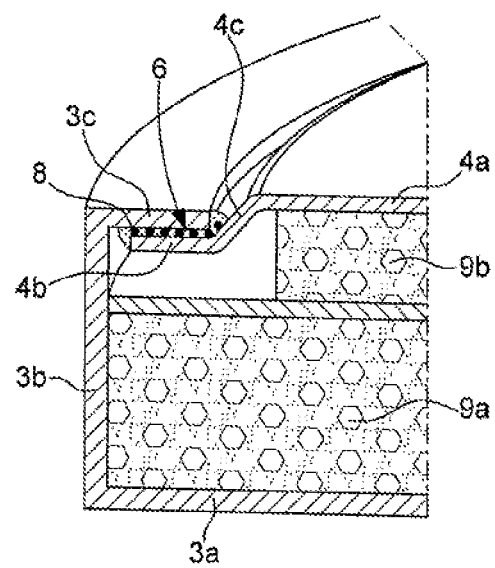
FIG. 3 is a variant of the FIG. 2B.
Figure 4:
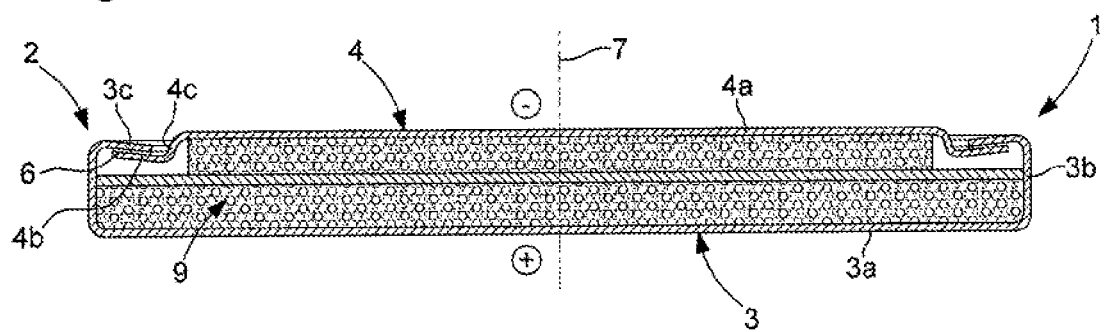
FIG. 4 is a perspective view in cross section of the cell assembly according to a preferred variant of the invention.
Figure 5:
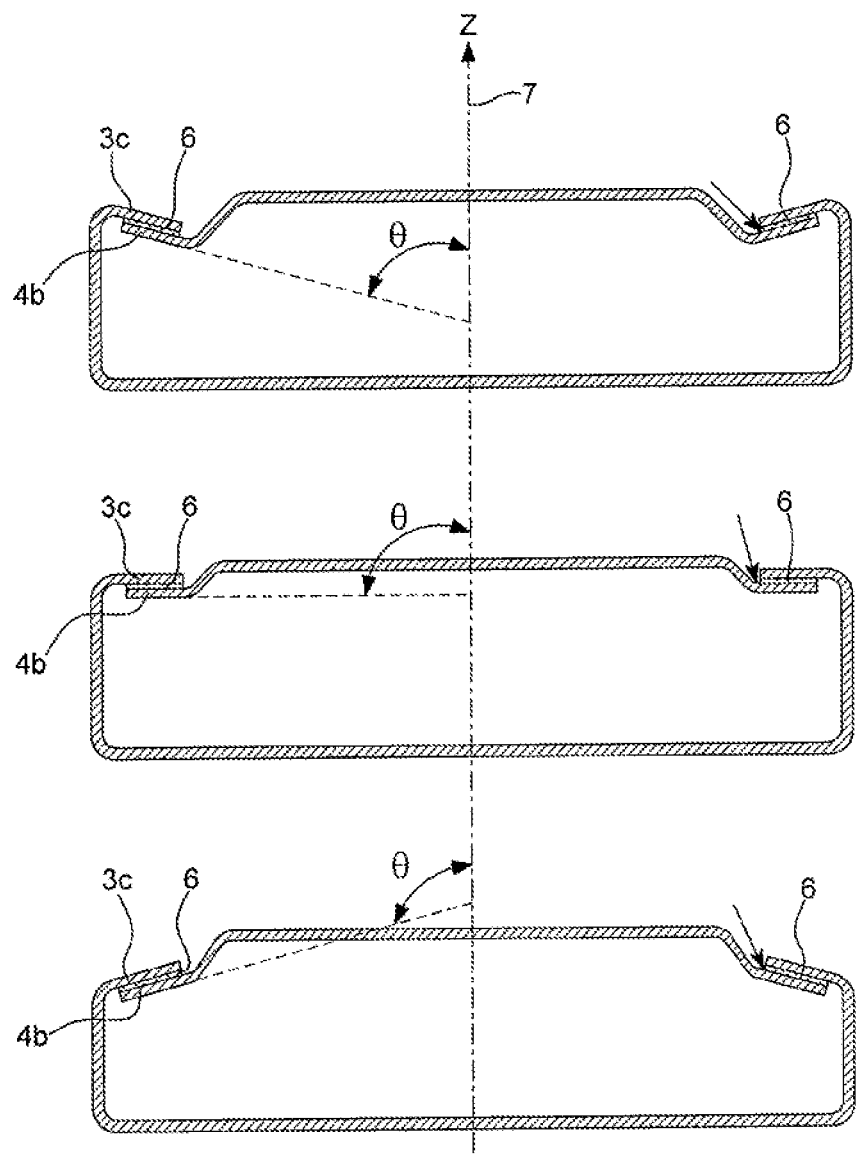
FIG. 5 is a schematic view of the different orientations of the edge area of the lid provided with the adhesive layer for the cell assemblies of FIGS. 4, 3 and 2B respectively.

The adhesive joint is arranged in such a way that it works in compression in case of overpressure inside the housing. To this end, the edge area 4b provided with the adhesive joint 6 comprises a zone extending in a direction not parallel to the center axis 7 of the housing defined as an axis substantially perpendicular to the plane of the base 3a. In the examples, the whole edge area 4b provided with the adhesive layer 6 extends in a direction not parallel to the center axis 7. Said zone of the edge area 4b may extend downwards in direction of the lateral wall 3b of the cup 3, as shown in FIGS. 2A and 2B. It may extend in a direction perpendicular to the center axis 7 as shown in FIG. 3 or preferably it may extend upwards in direction of the lateral wall 3b of the cup 3 as shown in FIG. 4. FIG. 5 schematically represents with respect to an axis Z corresponding to the central axis 7 perpendicular to the base 3a of the cup 3, the different orientations of the edge area 4b for the variants of the FIGS. 2B, 3 and 4. For the upper drawing representing the preferred variant of FIG. 4, the edge area 4b is inclined with an angle θ lower than 90° and preferably comprised between 75° and 90°. For the middle drawing representing the variant of FIG. 3, the edge area 4b is inclined with an angle θ of 90° C. For the lower drawing representing the variant of FIG. 2B, the angle θ is greater than 90° and preferably comprised between 90° and 115°. Simulations have shown that, in case of an overpressure inside the housing within a given range of pressure, the adhesive joint is subject to a maximum stress in the corner at the end of the joint indicated by an arrow in FIG. 5. For the preferred variant of FIG. 4, this maximum stress is strongly reduced with a value almost divided 2.

The adhesive joint has a thickness substantially constant, greater than 50 μm in order to guarantee the galvanic isolation between the positive and the negative poles. Preferably, as shown in FIG. 3, the adhesive joint 6 comprises one or several spacers 8 allowing to control its thickness during the curing step. The spacers can be in the form of particles evenly distributed in the joint or of a continuous structure like a fabric extending along the adhesive joint.

The method for manufacturing the cell comprises the following steps 1 to 5 with no specific order to perform the steps 2 or 3. For the steps 3 and 4, it is not excluded to apply the adhesive layer on the first part after the latter has been inserted inside the second part. These steps 1 to 5, which will be now described in more details, are:

1. Providing a first part and a second part respectively intended to form the lid and the cup of the housing after assembly;

2. Filling at least a solid active material into the second part and/or the first part;

3. Applying an adhesive layer on the edge area of the first part;

4. Inserting the first part provided with the adhesive layer into the second part, said adhesive layer finally facing outside the second part;

5. Bending an upper portion of the second part on the adhesive layer of the first part and curing the adhesive layer to close and seal the housing.

1. Providing the Different Parts to be Assembled to Form the Housing

Figure 6:
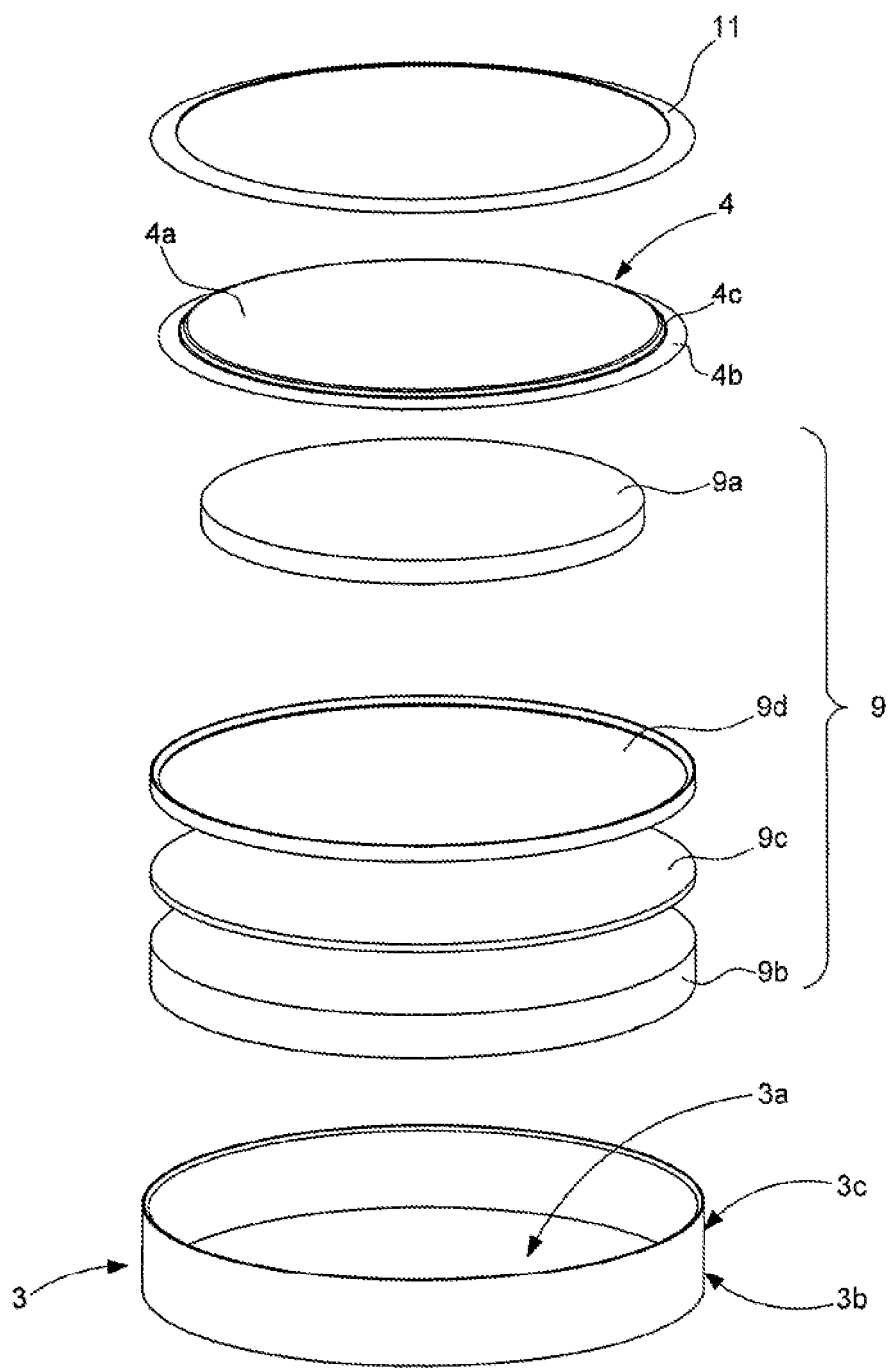
FIG. 6 is an exploded view of the different elements (housing+active material) forming the cell.

The housing is assembled starting from two parts, which are typically two deep-drawn metallic sheets. Referring to FIG. 6, a first part intended to form the lid 4 of the housing is provided. This part comprises the central area 4a, the connecting area 4c and the edge area 4b to which the adhesive layer 11 is subsequently applied. A second part intended to form the cup 3 of the housing is provided. This second part comprises the base 3a, the side wall 3b,3c comprising a lower portion intended to form the lateral wall 3b of the cup and an upper portion intended to form the upper rim 3c of the cup after assembly. According to the invention, the open end of the second part has a larger section than the section of the first part so that the latter can be inserted inside the second part during assembly. For example, the first part and the second part can be cylindrical with the diameter of the second part greater than the diameter of the first part. In another example represented in FIG.

8, the second part can have a truncated cone shape with a side wall 3b,3c flaring outwardly in the direction of the open end and with a diameter at the open end greater than the diameter of the first part.

2. Filling the Active Material Inside the Second Part

Referring again to FIG. 6, at least a part of the active material 9 is disposed inside the second part. The active material may comprise the anodic material 9a, the cathodic material 9b, the reservoir 9c, the separator 9d and the electrolyte (not shown). According to a variant, all the active material is inserted inside the second part and/or the first part before closing the housing. According to a preferred variant of the invention, only the solid active material is inserted inside the second part and/or the first part at this step and the liquid electrolyte is filled inside the housing after closing it. It is to be noted that the active material is represented in a schematic way, in particular the anodic material 9a. Indeed, at the end of the fabrication of the cell, i.e. in the final/finished cell, the active material with the electrolyte entirely fill the space inside the housing formed by the assembled two parts 3 and 4.

The at least part of the active material can be directly inserted into the second part. In a variant, the at least part of the active material, in particular the anodic material, is pressed on the inner side of the first part and inserted inside the second part in a subsequent step with the first part. This can be advantageous for ensuring a perfect contact between the anodic lid and the anodic material.

Figure 9:
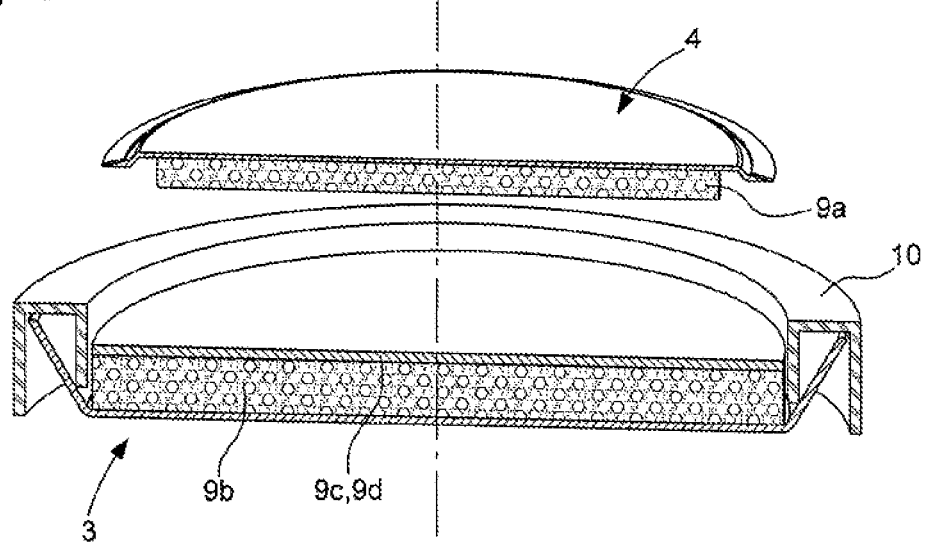
FIG. 9 illustrates with a perspective view in cross section one variant for protecting a surface of the cup from a contamination by the electrolyte.

If the liquid material is filled at this step, precautions are preferably taken to prevent a contamination by the active material of the surface 3c of the second part intended to be in contact with the adhesive. Among the precautions are the protection of the surface by a ring 10 (FIG. 9). Another precaution consists in adapting the geometry of the first and second parts so that the liquid active material does not reach the surface 3c during filling. In this respect, the height of the second part can be increased such that the liquid active material only fills a lower region of the second part. The extra height is then subsequently bent to form a longer upper rim. Another precaution consists in injecting the electrolyte in the second part with nozzles provided with a cover to prevent splashes from reaching the surface 3c during filling. Another way consists in reducing the quantity of electrolyte inside the cell.

Figure 10:
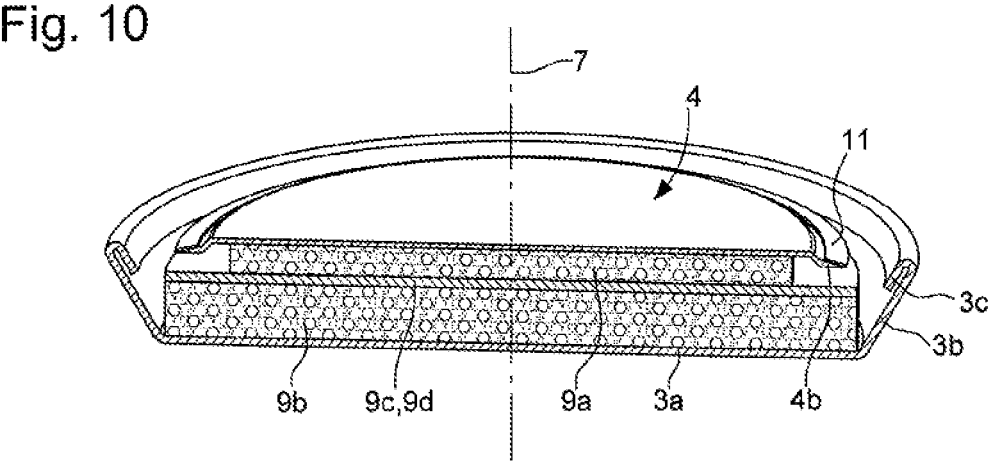
FIG. 10 illustrates with a perspective view in cross section one of the preferred variants for preparing a clean surface before the bending step in the method of manufacturing according to the invention.

In addition to or as an alternative to precautions for preventing the contamination, other ways consist in restoring a clean surface after filling the active material. A preferred variant shown in FIG. 10 consists in folding a part of the upper portion of the side wall 3b,3c on the inner side of the side wall in such a way that a surface not previously exposed to the liquid active material faces the edge area 4b of the first part after inserting the latter into the second part. Accordingly, the height of the second part has to be adapted. Other variants consist in cleaning the surface after filling the active material. One variant consists in mechanically cleaning the surface with a brush. A preferred variant consists in a cleaning like a laser cleaning creating a local plasma abrading the surface.

3. Applying the Adhesive Layer on the First Part

Before inserting the first part into the second part, a layer of adhesive 11 is applied on the edge area 4b of the first part. This adhesive can be a film (solid adhesive) or a liquid adhesive. Just to cite a few, the adhesive can be an epoxy glue, a polyurethane glue, an acrylate glue, etc. As previously mentioned, the adhesive can comprise one or several spacers. The spacers can be inserted in the adhesive before application or the spacers can be disposed on the first part before applying the adhesive.

For improving the adhesion of the joint, one or two of the surfaces intended to come into contact with the adhesive may be treated and even functionalized before applying the adhesive. For example, the surfaces can be abraded with alumina particles coated with silica leading to the deposition of a silica layer on the surfaces. Then, optionally, the treated surfaces can be functionalized by applying an adhesion promoter comprising silane groups with alkoxyl functions forming a chemical bond with the silica layer and other functions intended to form a chemical bond with the adhesive. Depending on the type of adhesive, the other functional groups can be amine or acrylate groups.

Figure 7A:
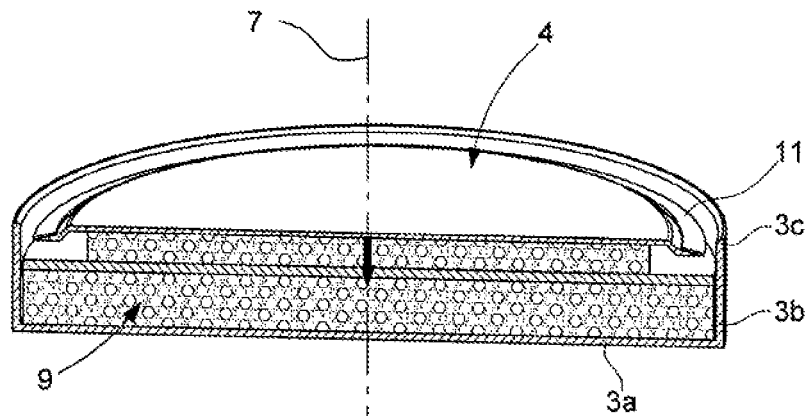
FIGS. 7A-7B schematically represent two steps of the method according to the invention for manufacturing cells.

4. Insertion of the First Part Provided with the Adhesive Layer Inside the Second Part Referring to FIG. 7A, the first part 4 with the adhesive layer 11 is inserted inside the second part where it rests on the active material 9 previously placed on the base 3a. The first part is inserted inside the second part through the open end and substantially coaxially with the center axis 7. It is inserted on a given height of the side wall 3b,3c corresponding to the length of the upper rim 3c of the cell after assembly.

Possibly, before the first part with the adhesive layer is inserted inside the second part or before closing the housing in the next step, the liquid active material (if present) can be frozen to prevent a contamination of the adhesive layer during the insertion step and/or the closing step.

5. Closing and Sealing the Housing

Figure 7B:
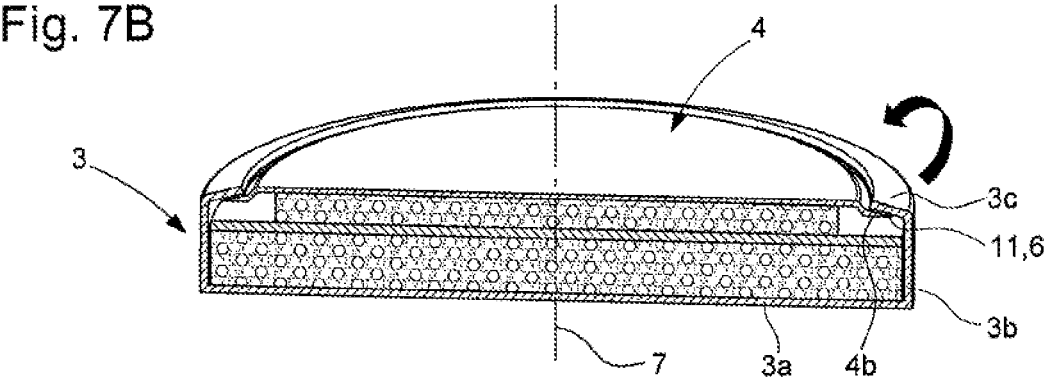

As shown in FIG. 7B, the upper portion of the side wall 3b,3c of the second part is bent on the edge area 4b of the first part provided with the adhesive layer 11 to form the upper rim 3c of the cup 3. Afterwards, the adhesive layer is cured to form the adhesive joint sealing the housing. This step of closing is preferably carried out under vacuum to prevent the active material (i.e. lithium) from burning in contact with the oxygen.

Figure 8:
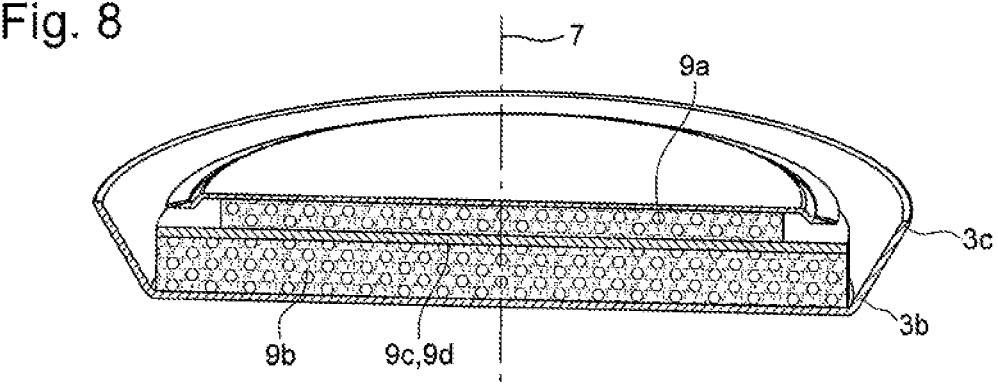
FIG. 8 is a variant of the FIG. 7A with a second part of truncated cone shape.

In addition, when the second part is a truncated cone as represented in FIG. 8, there is preferably a further step before the bending step consisting in folding inwards the side wall 3b,3c to form a housing with a cylindrical wall.

Finally, if the liquid active material has not been previously filled in the second part, there is a last step of filling the electrolyte under vacuum inside the closed housing via a hole provided in the cup. It is provided either in the base 3a or in the lateral wall 3b. Then the hole is closed by gluing or preferably by welding and more preferably by laser welding providing an important and localized source of heat easily dissipated without affecting the properties of the housing and the active material.

LEGEND (1) Cell
(2) Housing
(3) Cup or Second part
   a. Base
   b. Lateral wall
   c. Upper rim
   b+c. Side wall of the second part
(4) Lid or First part
   a. Central area
   b. Edge area
   c. Connecting area
(5) Seal/Gasket
(6) Adhesive joint (cured)

(7) Center axis
(8) Spacer
(9) Active material
  a. Anodic material
  b. Cathodic material
  c. Reservoir
  d. Separator
(10) Ring
(11) Adhesive layer (not cured or partly cured)

The invention claimed is:

1. A button cell comprising:
a two-part housing including a cup and a lid respectively defining two poles of the cell and assembled with an adhesive joint, said cup comprising a base, a lateral wall and an upper portion turned towards the inside of the two-part housing, said lid comprising a central area and an edge area surrounding the central area,
wherein said edge area comprises a zone which is inclined or perpendicular with respect to a center axis of the two-part housing which is perpendicular to the base of the cup,
wherein the upper portion of the cup covers, in the direction of said center axis, at least partially said zone of the edge area of the lid with at least a part of the adhesive joint disposed between said upper portion and said zone of the edge area,
wherein said zone of the edge area, said upper portion and said at least a part of the adhesive joint are inclined or perpendicular with respect to said center axis, and
wherein said adhesive joint extends over active material in the direction of said center axis by sealing and insulating the housing.

2. The button cell according to claim 1, wherein said zone of the edge area and the upper portion, together with said at least a part of the adhesive joint, are inclined with an angle θ lower than 90° with respect to the center axis.

3. The button cell according to claim 1, wherein said zone of the edge area and the upper portion, together with said at least a part of the adhesive joint, are inclined with an angle θ comprised between 75° and 90° with respect to the center axis.

4. The button cell according to claim 1, wherein said zone of the edge area and the upper portion, together with said at least part of the adhesive joint, are inclined with an angle θ greater than 90° with respect to the center axis.

5. The button cell according to claim 1, wherein said zone of the edge area and the upper portion, together with said at least part of the adhesive joint, are inclined with an angle θ comprised between 90° and 115° with respect to the center axis.

6. The button cell according to claim 1, wherein the adhesive joint extends to the connecting area and/or beyond said zone of the edge area in direction of the lateral wall of the cup.

7. The button cell according to claim 1, wherein said at least a part of the adhesive joint comprises one or several spacers.

8. The button cell according to claim 1, wherein said at least a part of the adhesive joint has a substantially constant thickness greater than 50 μm.

9. The button cell according to claim 1, wherein the cup and the lid are both single parts each integrally made of one deep-drawn sheet.

10. A button cell comprising:
a two-part housing including a cup and a lid respectively defining two poles of the cell and assembled with an adhesive joint, said cup comprising a base, a lateral wall and an upper portion turned towards the inside of the two-part housing, said lid comprising a central area and an edge area surrounding the central area,
wherein said edge area comprises a zone which is inclined or perpendicular with respect to a center axis of the two-part housing which is perpendicular to the base of the cup,
wherein the upper portion of the cup covers, in the direction of said center axis, at least partially said zone of the edge area of the lid with at least a part of the adhesive joint disposed between said upper portion and said zone of the edge area,
wherein said zone of the edge area, said upper portion and said at least a part of the adhesive joint are inclined or perpendicular with respect to said center axis, and
wherein said adhesive joint seals and insulates the housing without additional insulator arranged between said edge area of the lid and said base of the cup.

11. The button cell according to claim 10, wherein said zone of the edge area and the upper portion, together with said at least a part of the adhesive joint, are inclined with an angle θ lower than 90° with respect to the center axis.

12. The button cell according to claim 10, wherein said zone of the edge area and the upper portion, together with said at least a part of the adhesive joint, are inclined with an angle θ comprised between 75° and 90° with respect to the center axis.

13. The button cell according to claim 10, wherein said zone of the edge area and the upper portion, together with said at least part of the adhesive joint, are inclined with an angle θ greater than 90° with respect to the center axis.

14. The button cell according to claim 10, wherein said zone of the edge area and the upper portion, together with said at least part of the adhesive joint, are inclined with an angle θ comprised between 90° and 115° with respect to the center axis.

15. The button cell according to claim 10, wherein the adhesive joint extends to the connecting area and/or beyond said zone of the edge area in direction of the lateral wall of the cup.

16. The button cell according to claim 10, wherein said at least a part of the adhesive joint comprises one or several spacers.

17. The button cell according to claim 10, wherein said at least a part of the adhesive joint has a substantially constant thickness greater than 50 μm.

18. The button cell according to claim 10, wherein the cup and the lid are both single parts each integrally made of one deep-drawn sheet.

* * * * *